Nov. 8, 1927.
W. A. SCHATZ
1,648,593
MEASURING FAUCET
Filed Aug. 12, 1925
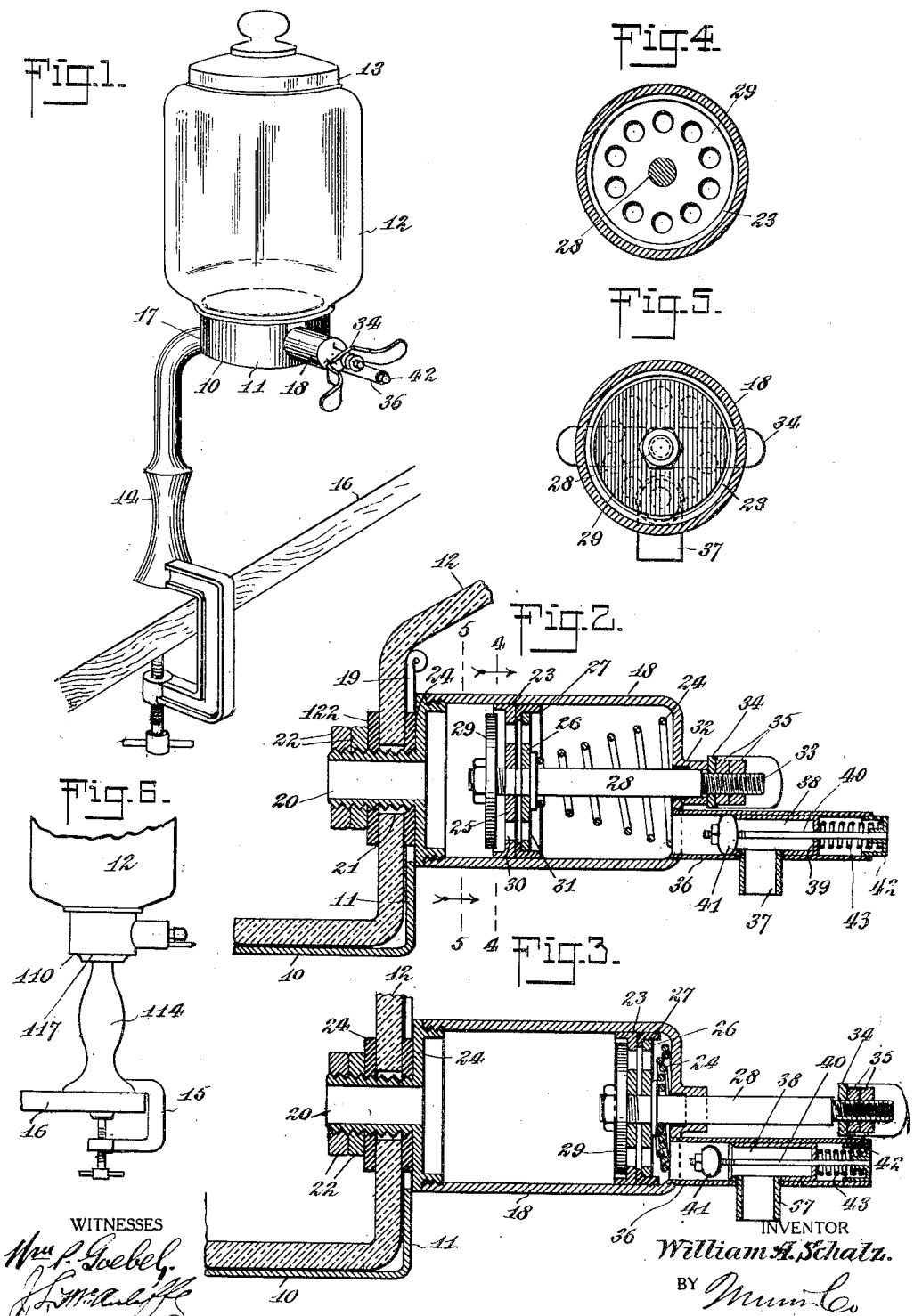
INVENTOR
William A. Schatz.
BY
ATTORNEYS
WITNESSES Patented Nov. 8, 1927.

1,648,593

UNITED STATES PATENT OFFICE.

WILLIAM A. SCHATZ, OF ASTORIA, NEW YORK.

MEASURING FAUCET.

Application filed August 12, 1925. Serial No. 49,815.

My invention relates to a measuring faucet and more particularly to a measuring faucet having special usefulness as applied to a syrup container.

The general object of my invention is to provide a measuring faucet that will function in a manner to positively force viscid syrups from the faucet in measured quantities.

A further object of my invention is to provide a measuring faucet having novel means whereby various predetermined quantities may be dispensed by the faucet.

A more specific object of the invention is to provide a measuring faucet having the maximum efficiency and simplicity.

Reference is to be had to the accompanying drawings forming a part of this specification, it being understood that the drawings are merely illustrative of one example of the invention.

Figure 1 is a perspective view of a measuring faucet embodying my invention showing the same applied to an inverted container from which liquid is to be withdrawn and in association with the rest provided for said container;

Figure 2 is a longitudinal vertical section of the faucet and a fragment of the container and its seat;

Figure 3 is a view similar to Figure 2 but showing the plunger in a position after forcing a predetermined quantity of fluid from the faucet;

Figures 4 and 5 are transverse vertical sections in planes indicated by the lines 4—4 and 5—5 of Figure 2;

Figure 6 is a digrammatic side elevation indicating a different mode of connecting the supporting standard with the container seat.

In carrying out my invention in practice, in accordance with the illustrated example, means is provided to constitute a seat 10 having a side flange 11 extending about the same, said seat being adapted to receive a container 12 here shown as having a closed bottom and a cover 13 at the top. The container and cover shown do not form part of the invention claimed in the present application. A suitable device is provided to sustain the seat 10, said sustaining means being shown as a standard 14. The standard 14 in the illustrated example has a clamp 15 to secure the same to a side 16 of a counter as at a soda fountain, for example. The standard 14 is shown in Figure 1 as rigid with the seat 10 at a side thereof as at 17. In the arrangement shown in Figure 6, the sustaining means for the seat 110 for receiving the container 12 consists of a vertical standard 114 connecting directly with the seat 110 at the bottom thereof as at 117.

In accordance with my invention, I provide a faucet body 18 which is coordinated with the flange 11 by producing a vertical slot 19 in said flange at a side thereof in which slot a nipple 20 on the faucet body 18 is accommodated so that said nipple 20 will protude into the seat 10 and be adapted to pass through a hole 21 in container 12 near the bottom for dispensing the contents of said container. The means to secure the faucet in the illustrated example consists of nuts 22 on nipple 20 within the container 12, said nipple having washers 24, 24 at the inner and outer surfaces of the container 12 to make a fluid-tight connection. In the faucet body 18 is a plunger unit designated generally by the numeral 23 at the back of which plunger unit is a coil compression spring 24 tending to force the plunger unit 23 forwardly. Said plunger unit includes a front disk 25 and a rear disk 26 within a ring 27. The plunger rod 28 carries a valve head 29 adapted to seat on the disk 25 for closing fluid ports 30 in said disk, there being alined ports 31 in the rear disk 26 of the plunger unit. The plunger rod 28 extends through a short boss 32 on the outer end of the faucet body 18, and beyond said boss, the outer end of the plunger rod 28 is threaded as at 33 and receives a fingerhold 34 presenting opposite side arms to be grasped by two fingers of a person in drawing liquid from the container 12.

The finger hold 34 has a hub 35 threaded onto the outer end 33 of plunger rod 28, the arrangement serving to permit of the finger hold 34 being adjusted inwardly or outwardly on the plunger rod for varying the stroke of said rod under the re-action of the spring 24.

At a side of the faucet body 10 is a discharge tube 36 for the fluid, said tube having a depending outlet nipple 37. Within the tube 36 is a bushing 38 having a closed outer end 39 through which passes a valve rod 40 carrying the resilient expansible valve 41 adapted to engage a valve seat formed by the front forward end of the bushing 38. Normally the valve 41 is of a size shown in Figure 3 to permit liquid to pass about the valve and through bushing 38 and outlet nipple 37. When the valve 41 is seated on the end of bushing 38, the valve expands sufficiently to effectively prevent the flow of liquid to the bushing 38 and nipple 37. A head 42 is provided on the outer end of valve rod 40 and adapted for reciprocating movement in the outer end of tube 36. An expansion spring 43 is disposed between the head 42 of the valve rod 40 and the closed end 39 of bushing 38, said spring normally tending to maintain the valve 41 on its seat and closing the bushing 38 against the flow of liquid.

In order to draw liquid through the faucet, two fingers of one hand are placed at the back of the finger-hold 34 so as to exert an outward pull on the plunger rod 28. Also, the thumb of the same hand is placed against the outer end of the head 42 to force the head and the valve rod 40 and valve 41 inwardly to unseat said valve as shown in Figure 3. The valve 41 having been unseated, the outward movement of the rod 28 will draw the plunger 29 against the front disk 23 closing the liquid ports 30 thereof. The continued movement of the plunger unit causes liquid at the back of said unit to be forced through the tube 36 and through the outlet 37. By adjusting the position of the finger-hold 34 and nuts 35 outward or inward on the threaded end 33 of plunger rod 28, the plunger unit will be brought nearer to or farther from the outer end of the faucet body, 18, thereby varying the size of the chamber at the back of the plunger unit, whereby various predetermined quantities of the liquid may be drawn.

With the above described assemblage, results are obtained which make for practical success in measuring faucets. It is universally recognized with respect to measuring faucets that leakage is liable to occur or that the measuring varies because of varying the level of the liquid in the vessel or container supplying the measuring chamber. In operation, it will be noted, that the initial action of the valves is to effect a closing movement of the plunger 29, thereby confining the full quantity of liquid in the measuring chamber and preventing all escape thereof. Secondly, it is to be noted that the initial closing movement of the plunger 29 is a condition precedent to the movement of the plunger unit (23) for ejecting the liquid from the measuring chamber. Again, the outlet valve 41 is moved to the open position before the ejecting movement of the plunger unit 23 and said ejecting movement of said plunger follows therefore in sequence the closing movement of the plunger 29 and the opening of outlet valve 41. The resistance offered by the liquid in the measuring chamber to any bodily movement of the plunger 23 insures the closing movement of the plunger 29 as an initial step in the operation. Secondly, although the spring 24 is inferior in strength to the spring 43 controlling the outlet valve 41, nevertheless, said outlet valve 41 is caused to unseat, by reason of the resistance offered by the liquid in the measuring chamber, to any movement of plunger 23 as a unit. Hence, the unseating of the valve outlet 41 is insured following the closing movement of plunger 29 and prior to the ejecting movement of the ejecting unit 23. It will be seen that the same precise quantity is measured and discharged in each complete movement of the plunger unit so long as the liquid in the container vessel is at a level above the height of the faucet body 18.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. The combination of a seat adapted to receive a vessel in which liquid is to be drawn, means to sustain said seat, a side flange on said seat having a vertical slot extending through the upper edge thereof, and a faucet connected with said vessel and adapted to move into or out of said slot for locating the faucet in said flange.

2. A measuring faucet assemblage including a body forming a measuring chamber adapted to contain a predetermined quantity of liquid, an ejector unit adapted for movement in said faucet body for ejecting the liquid from the measuring chamber and return, said ejector unit affording a passage therethrough of the liquid to said chamber, a plunger forming part of said ejector unit and movable to a position to close the passage through said unit or to a position permitting the flow of liquid through the unit, a discharge for the fluid ejected, and an outlet valve controlling said discharge, said plunger and the said outlet valve when in the closed position serving to confine the liquid in the measuring chamber so that the resistance of the confined liquid will prevent bodily movement of the ejector unit after the movement of said plunger to the closed position whereby the said plunger will first move to the closed position, and the outlet valve to the open position in sequence and preceding the bodily ejecting movement of the ejector unit.

3. A measuring faucet including a body forming a measuring chamber adapted to contain a predetermined quantity of liquid and having a discharge outlet, an ejector unit adapted for reciprocal movement in said chamber for ejecting the liquid, said unit affording passage therethrough to said chamber for a measured quantity of the liquid to be ejected, a plunger member associated with said unit, a plunger rod mounting said plunger and adapted to move said plunger to a position closing said ejector unit or to a position opening said unit for the passage of liquid, an outlet valve controlling said discharge outlet, a spring to restore the ejector unit after an ejecting movement, and means to actuate the plunger rod for moving the plunger to a position opening said ejector unit or to a closing position, and manually controlled means to cause an opening movement of said outlet valve; together with spring-pressed means normally tending to move the outlet valve to a closed position; said spring-pressed means having a resistance to yielding superior to that of the spring for restoring the ejector unit.

WILLIAM A. SCHATZ.